US006952760B2

(12) United States Patent
Boucher et al.

(10) Patent No.: US 6,952,760 B2
(45) Date of Patent: Oct. 4, 2005

(54) METHODS AND SYSTEMS FOR MEMORY ALLOCATION

(75) Inventors: Michael L. Boucher, Lafayette, CO (US); Theresa H. Do, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 275 days.

(21) Appl. No.: 10/442,375

(22) Filed: May 21, 2003

(65) Prior Publication Data

US 2004/0236922 A1 Nov. 25, 2004

(51) Int. Cl.⁷ .............................................. G06F 13/00
(52) U.S. Cl. ........................ 711/170; 711/117; 711/154
(58) Field of Search ................................ 711/170, 117, 711/154

(56) References Cited

PUBLICATIONS

David A. Patterson, Computer Architecture: a quantitative approach, Memory–Hierarchy Design, Chapter 8P. 403–497 (1990).

Paul N. Swarztrauber, http://netlib.org/ffpack/doc, A Package of Fortran Subprograms for the Fast Fourier Transform of Periodic and Other Symmetric Sequences, Version 4, Apr. 1985.

Sun Microsystems, Inc., Madvise (3C), Standard C Library Functions, Madvise–Provide Advice to VM System, Printed Sep. 12, 2002.

Charles Van Loan, Computational Frameworks for the Fast Fourier Transform, The FFT Idea, (1992).

*Primary Examiner*—Reba I. Elmore
(74) *Attorney, Agent, or Firm*—Sonnenschein Nath & Rosenthal LLP

(57) ABSTRACT

Methods and systems consistent with the present invention allocate memory for program data during fast Fourier transform computation in a way that is favorable for a given access pattern for the program data, and for the memory architecture of a given data processing system. As a result, the overhead associated with accessing the program data is reduced compared to typical memory allocation performed during fast Fourier transform computation. Thus, a fast Fourier transform computing program that manipulates the program data typically runs faster and produces results more quickly.

29 Claims, 4 Drawing Sheets

METHODS AND SYSTEMS FOR MEMORY ALLOCATION

FIELD OF THE INVENTION

This invention relates to memory allocation in data processing systems. In particular, this invention relates to strategically allocating memory areas for program data during fast Fourier transform processing in order to reduce the overhead associated with accessing the program data.

BACKGROUND OF THE INVENTION

Modern computer systems store data throughout a hierarchy of memories. For example, an extremely fast (but typically small) cache memory is commonly provided closest to the system processor (in some instances on the same die as the processor). Beyond the cache memory and external to the processor are memory modules that hold much larger amounts of random access memory (RAM). In addition, most modern operating systems provide a virtual memory subsystem that allows the computer system to treat the enormous capacity of magnetic storage (e.g., disk drives) as additional system memory.

In general, the "closer" the memory is to the processor, the faster the processor may access the data stored in the memory. Thus, the processor quite rapidly executes read and write operations to the cache, and executes somewhat slower read and write operations to the external RAM. The slowest access generally arises from a read or write operation that requires the operating system to access memory space that has been stored on the disk. The access penalties associated with retrieving data stored outside the cache are so severe that program performance can be crippled if the program requires frequent access to those memory areas (and more particularly, through the virtual memory system to the disk).

In the past, there were few approaches available for placing data in memory in order to keep data "close" to the processor. As one example, in non-uniform memory architecture (NUMA) machines (i.e., machines that included multiple memories and processors distributed over multiple distinct system boards), the time to access memory typically varied from one processor to another. This was typically because the physical memory chips were located on boards that took differing amounts of time to reach. If a processor repeatedly made such access requests, the operating system might create a copy of the requested data and place it in a memory on the same system board as the requesting processor. This process, sometimes referred to as page migration, worked only at a very coarse level (i.e., by determining no more than on which board data should reside). Also, there were systems, however, in which all memory accesses cost the same regardless of location relative to the reading or writing processor.

Another approach, taken by High Performance Fortran (HPF) was to add proprietary extensions to a programming language to give the programmer a small amount of control over data placement in memory. For example, a programmer might be able to specify that an array be distributed in blocks over several boards in a NUMA architecture. However, the language itself was generally unaware of the operating system, the hardware, and their impact on placement of data in memory. Thus, while HPF could also provide some coarse control over data placement, the code was not portable, and the programmer was unduly constrained in choices of programming languages.

Alternatively, a programmer could, by hand, attempt to specify an optimal layout for one or more pieces of program data. For example, a programmer might manually manipulate array sizes so that the array fell into desirable parts of memory. Doing so, however, led to atrocious programmer time and resource costs, and was still not guaranteed to provide an efficient solution over all of the various operating systems, hardware platforms, and process loads under which the program might run.

Further, during computation of fast Fourier transforms (FFTs), conventional memory allocation techniques typically offset program data by power-of-two strides, making it difficult to place program data close to the processor and causing memory conflicts. For example, a typical FFT computing program uses at least two arrays to compute an FFT. The arrays include a first array for storing inputted signal samples and a second array for providing a workspace. If each of the arrays has a size of 1024 words, then based on conventional memory allocation techniques, the arrays are offset by 1024 words. In other words, the arrays are offset in memory by a power-of-two stride of 1024 words (i.e., $2^9$).

Offsetting the arrays by 1024 words, however, creates a conflict with a system that is configured, for example, for sequential memory access or for an offset of 512 words. Also, if the program computing the FFT alternates access to the arrays, the alternating access can result in a conflict when the arrays are offset by a power-of-two-word displacement.

Therefore, a need has long existed for a memory allocation technique that overcomes the problems noted above and others previously experienced.

SUMMARY OF THE INVENTION

Methods and systems consistent with the present invention provide a mechanism that automatically allocates memory for program data during FFT computation in a way that is favorable for the memory system of the data processing system. The methods and systems reduce the overhead associated with accessing the program data. As a result, the FFT computing program-that manipulates the program data runs faster and produces results more quickly than typical methods and systems.

Methods and systems consistent with the present invention overcome the shortcomings of the related art by allocating memory for the program data with an offset other than a power of two offset. The memory is allocated, for example, by taking into consideration the structure of the memory hierarchy in the data processing system when allocating the memory for the program data. As a result, the program incurs less memory access overhead during its execution. For example, the program may more often find its data in cache rather than swapped out to disk.

According to methods consistent with the present invention, a method for allocating memory during fast Fourier transform calculating is provided in a data processing system. The method includes receiving from a fast Fourier transform calculating program a request to allocate memory for at least first and second variables. The method then determines when both variables will simultaneously fit in a cache memory and, in response, allocates a first address range in the main memory for the first variable and a second address range in the main memory for the second variable. The first address range maps to a different location in the first cache memory than the second address range. The method then returns to the fast Fourier transform calculating program memory references for the address ranges.

In accordance with apparatuses consistent with the present invention, a data processing system is provided. The data processing system includes a cache memory, a main memory, and a processor. The main memory includes a memory allocation program for receiving a request to allocate memory for a first variable and a second variable during fast Fourier transform computation, the first variable and the second variable being used by a fast Fourier transform computing program to compute a fast Fourier transform, determining when both variables will simultaneously fit in the first cache memory, and in response, allocating a first address range in the main memory for the first variable and a second address range in the main memory for the second variable. Again, the first address range maps to a different location in the first cache memory than the second address range. The processor runs the memory allocation program.

In addition, a computer-readable medium is provided. The computer-readable medium contains instructions that cause a data processing system including a cache memory and a main memory to perform a method for allocating memory during fast Fourier transform computation. The method includes receiving from a fast Fourier transform computing program a request to allocate memory for a first variable and a second variable, determining when both variables will simultaneously fit in the first cache memory, and in response, allocating a first address range in the main memory for the first variable and a second address range in the main memory for the second variable, such that the first address range maps to a different location in the first cache memory than the second address range. The method also returns to the fast Fourier transform computing program a first memory reference for the first address range and a second memory reference for the second address range.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying drawings.

DETAILED DESCRIPTION OF THE INVENTION

Reference will now be made in detail to an implementation in accordance with methods, systems, and articles of manufacture consistent with the present invention as illustrated in the accompanying drawings. The same reference numbers may be used throughout the drawings and the following description to refer to the same or like parts.

Figure 1:
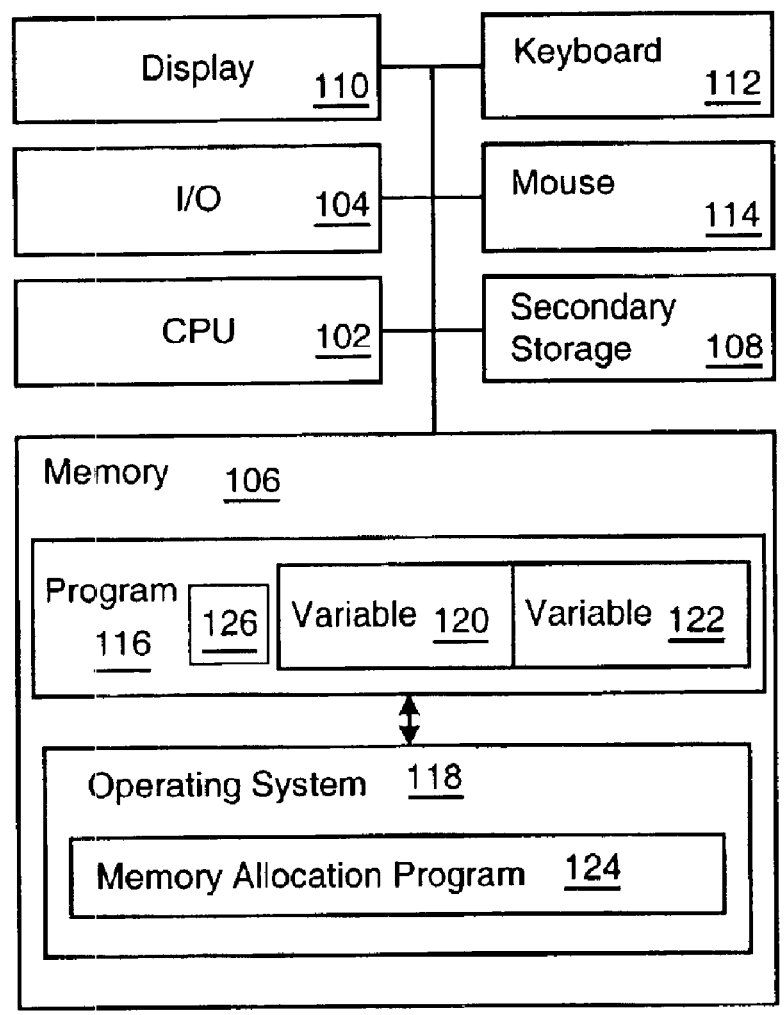
FIG. 1 depicts a block diagram of a data processing system suitable for use with methods and systems consistent with the present invention.

FIG. 1 depicts a block diagram of a data processing system 100 suitable for use with methods and systems consistent with the present invention. The data processing system 100 comprises a central processing unit (CPU) 102, an input-output (I/O) unit 104, a memory 106, a secondary storage device 108, and a video display 110. The data processing system 100 may further include input devices such as a keyboard 112, a mouse 114 or a speech processor (not illustrated).

The memory 106 contains an FFT computing program 116 that communicates via message passing, function calls, or the like with an operating system 118. The program 116 represents any FFT computing program running on the data processing system 100 that uses memory for storing variables (e.g., a first variable 120 and a second variable 122) or data. Program 116 comprises program code 126 for computing an FFT based on an FFT algorithm. FFT algorithms and program code for computing FFTs are known to one having skill in the art and will not be described in detail herein. The FFT algorithm used by program 116 can be, for example, the "fft.f" subroutine attached hereto in Appendix A, which is incorporated herein by reference. The "fft.f" subroutine is written in Fortran. One having skill in the art will appreciate that program 116 is not limited to being written in Fortran and is not limited to the "fft.f" subroutine. Program 116 can be written in any suitable programming language and include any FFT algorithm suitable for use with methods and systems consistent with the present invention.

The FFT algorithm of program 116 uses at least two arrays while computing an FFT. As an illustrative example, a first array INPUT stores signal samples and a second array WORK provides a workspace, a trigonometric table useful for computing the FFT, and a prime factorization of the number of signal samples. Because the FFT algorithm alternates accesses between the arrays during the FFT computation, the FFT algorithm can run faster if both arrays are kept close to the CPU 102, such as in a cache of the CPU 210. Thus, as will be described in more detail below, a memory allocation program 124 allocates an address range for each array variable to avoid cache displacement at one or more levels of the cache, if possible.

Operating system 118 includes the memory allocation program 124 that responds to memory allocation requests, for example, from program 116 or from operating system 118. As will be explained in more detail below, the memory allocation program 124 allocates space in the memory 106 for program variables.

Although aspects of methods, systems, and articles of manufacture consistent with the present invention are depicted as being stored in memory 106, one skilled in the art will appreciate that these aspects may be stored on or read from other computer-readable media, such as secondary storage devices, like hard disks, floppy disks, and CD-ROMs; a carrier wave received from a network such as the Internet; or other forms of ROM or RAM either currently known or later developed. Further, although specific components of data processing system 100 are described, one skilled in the art will appreciate that a data processing system suitable for use with methods, systems, and articles of manufacture consistent with the present invention may contain additional or different components.

Figure 2:
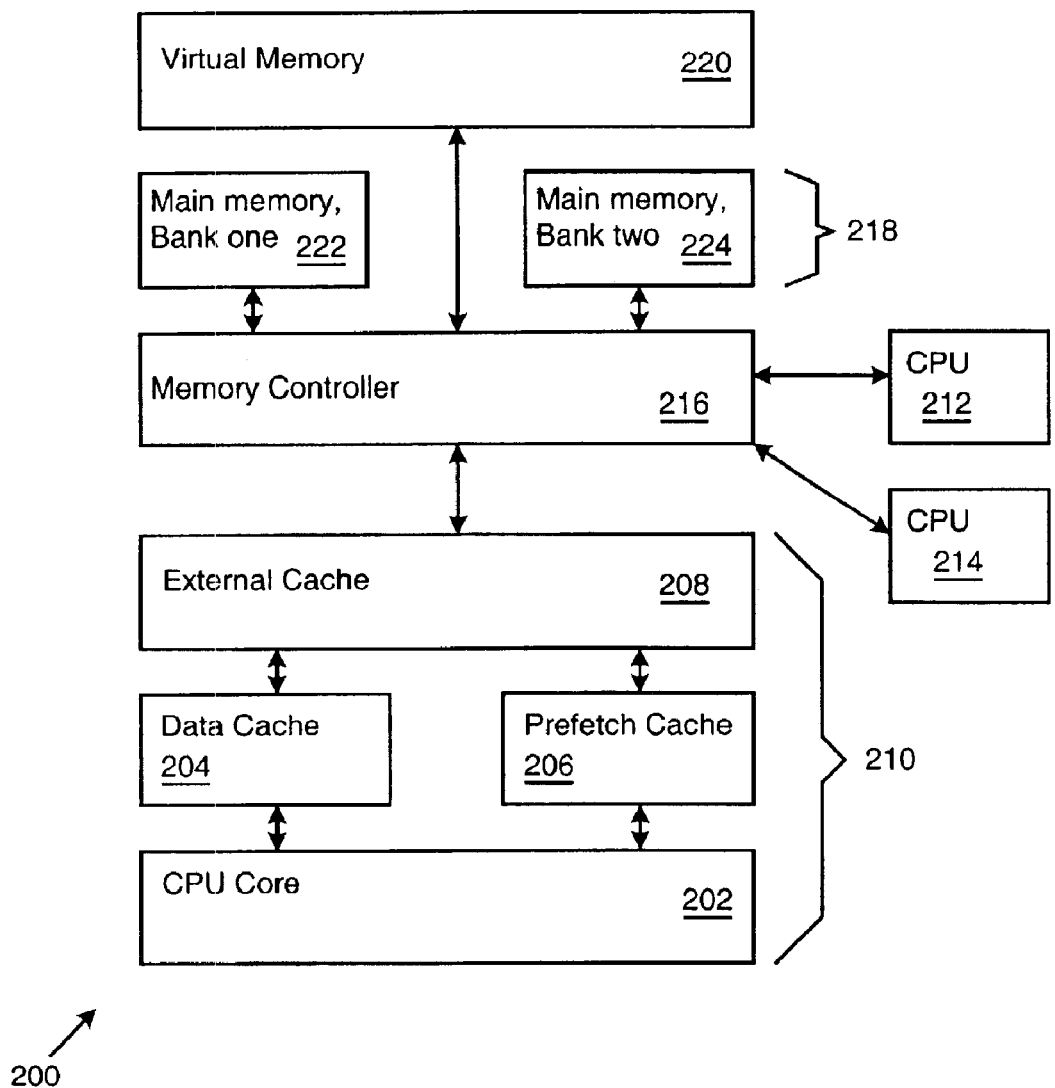
FIG. 2 depicts a memory hierarchy for the data processing system shown in FIG. 1 in which a memory allocation program running in the data processing system shown in FIG. 1 allocates space for program variables.

Referring to FIG. 2, a lower-level block diagram 200 of the memory hierarchy of the data processing system 100 is shown. Closest to a CPU core 202 (e.g., internal logic and control circuits) are two first level cache memories 204 and 206. Cache memory 204 is a data cache that stores, generally, the data most recently used by CPU core 202.

Cache memory 206 is a prefetch cache that CPU core 202 uses to prefetch data that it expects to soon need from main memory. First level cache memories 204 and 206 are generally the smallest and fastest caches available to CPU core 202.

A second level cache 208 is also provided. Second level cache 208 is generally larger than first level caches 204 and 206 and is also implemented as an extremely high-speed memory. Generally, however, CPU core 202 needs additional clock cycles to obtain data from second level cache 208. Thus, accessing data from second level cache 208 typically takes more time than accessing data from first level caches 204 and 206. In many processors, the first level cache and second level cache are incorporated onto a single die, or into a single package with multiple dies that forms a CPU 210. CPUs 212 and 214 are similar to CPU 210. Each of CPUs 210, 212, and 214 are similar to CPU 102.

Continuing with reference to FIG. 2, one of more CPUs 210, 212, and 214 couple to a memory controller 216. Memory controller 216 handles memory access cycles generated by CPUs 210–214. Thus, for example, when CPU 210 needs data that is not found it its cache, memory controller 216 determines where the data may be found, generates memory control signals to retrieve the data, and forwards the data to the CPU.

To that end, memory controller 216 communicates with a main memory 218 and a virtual memory system 220 (which may be implemented, for example, using part of the secondary storage 108). The main memory, as shown in FIG. 2, includes multiple memory banks. In particular, the main memory shown in FIG. 2 includes a first memory bank 222 and a second memory bank 224. Memory banks 222 and 224 are generally independent in the sense that read or write operations to one of the banks does not prevent the memory controller from immediately reading or writing data to the other bank.

Main memory 218 can be implemented with large capacity dynamic RAMs or DRAM modules. In most implementations, however, dynamic RAMs need to be refreshed when data is read out. As a result, two consecutive reads to the same memory bank occur more slowly than two consecutive reads to different memory banks. Thus, it can be advantageous to place the start of variables (e.g., array INPUT and array WORK) needed in sequence in separate memory banks. Because the memory banks can be interleaved, sequential accesses to a block of data will sequentially move through each bank.

It is noted that the memory hierarchy illustrated in FIG. 2 is merely illustrative and methods and systems consistent with the present invention are not limited thereto. For example, prefetch data cache 206, second level cache 208, or virtual memory system 220 need not be present in the data processing system. Furthermore, the size and configuration of cache memories 204, 206, and 208 and main memory 218 may vary in size, speed, location, and organization.

Figure 3:
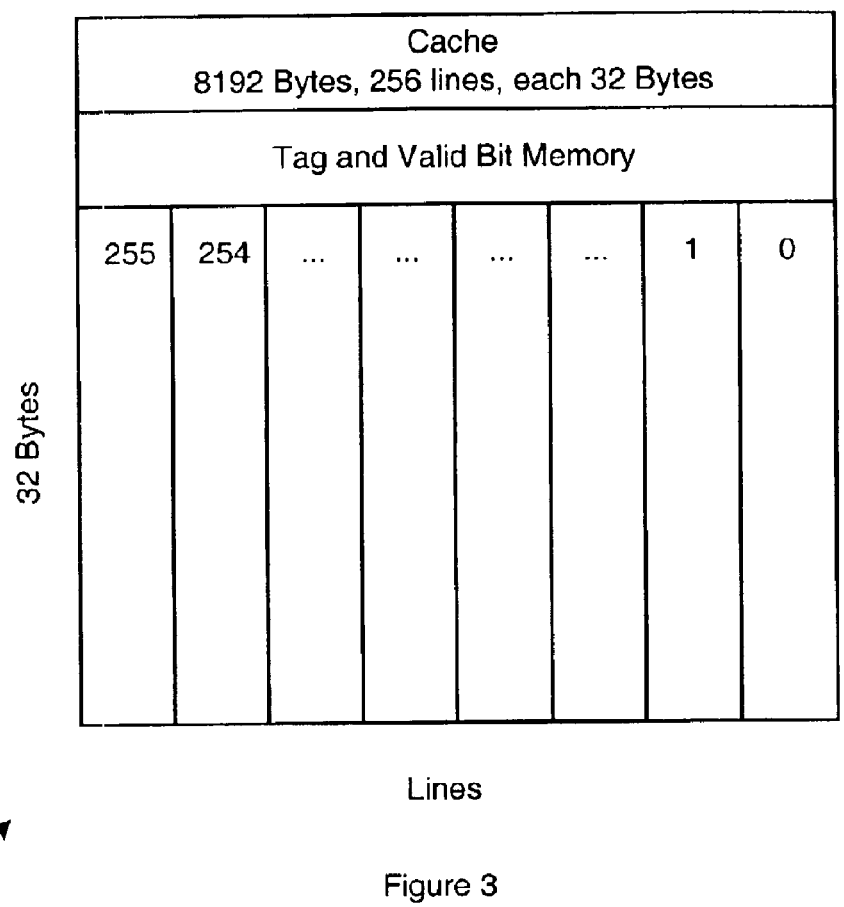
FIG. 3 depicts an example of a direct mapped cache in the memory hierarchy of the data processing system shown in FIG. 1.

FIG. 3 depicts a cache memory 300. Cache memory 300 can be, for example, data cache 204, prefetch cache 206, or external cache 208. Cache memory 300 has a particular physical organization that determines how much data will fit in the cache, and where that data will reside. More specifically, each cache memory has a size and an organization. With regard to FIG. 3, cache memory 300 is organized as 256 directly mapped cache lines, each 32 bytes in length. Cache memory 300 thereby has a size of 8192 bytes. Alternate organizations are also possible. For example, cache memory 300 may be a set associative cache or a fully associative cache, or cache memory 300 may have greater or fewer lines or bytes per line.

A cache is directly mapped when a memory block (retrieved from outside the cache) can only be placed in one predetermined line in the cache. A cache is fully associative when a memory block can be placed anywhere in the cache. A cache is set associative when a memory block can be placed in a set of 2 or more lines in the cache. More information on cache organization and operation can be found, for example, in *Computer Architecture, A Quantitative Approach*, Patterson & Hennessy, Morgan Kaufmann Publishers, Inc. (1990).

A memory address is divided into pieces when determining where a memory block retrieved from the main memory will reside in the cache. One piece is referred to as the block-frame address and represents the higher-order address bits that identify a memory block. The second piece is referred to as the block-offset address and is the lower-order piece of the address that represents data within the memory block. Assuming, for example, a 32 byte cache line (i.e., a 32 byte memory block) and 32 bit addresses, the upper 27 address bits are the block-frame address, while the lower 5 bits represent data within the block.

For a directly mapped cache, the location at which a memory block covered by an address range will be placed in the cache is given, for example, by (block-frame address) modulo (number of cache lines). Table 1 below gives two exemplary mappings for address ranges to cache lines in the direct mapped cache 300.

TABLE 1

| Start of address range | End of address range | Cache line |
| --- | --- | --- |
| 1100 0111 0101 1111 0101 1011 0110 0000 0xC75F5B60 | 1100 0111 0101 1111 0101 1011 0111 1111 0xC75F5B7F | 1101 1011 (line 219) |
| 1100 0111 0101 1111 0100 1011 0110 0000 0xC75F4B60 | 1100 0111 0101 1111 0100 1011 0111 1111 0xC75F4B7F | 0101 1011 (line 91) |

For associative caches, there are multiple locations in which a data block for a given address range may reside. Thus, for example, for a 4-way set associative cache, data blocks covered by four address ranges that would otherwise map to the same cache line may be accommodated in the cache simultaneously. A fifth data block covered by an address range that maps to the same cache line would then displace one of the four data blocks. In general, when a subsequent address range maps to a location in the cache with existing data, that existing data is overwritten or displaced.

When existing data is displaced, additional clock cycles are required to subsequently obtain that data and store it in the cache again so that a program may again manipulate it. For that reason, the memory allocation program 124 allocates, for program variables, address ranges that do not cause displacement in the cache between individual program variables.

Figure 4:
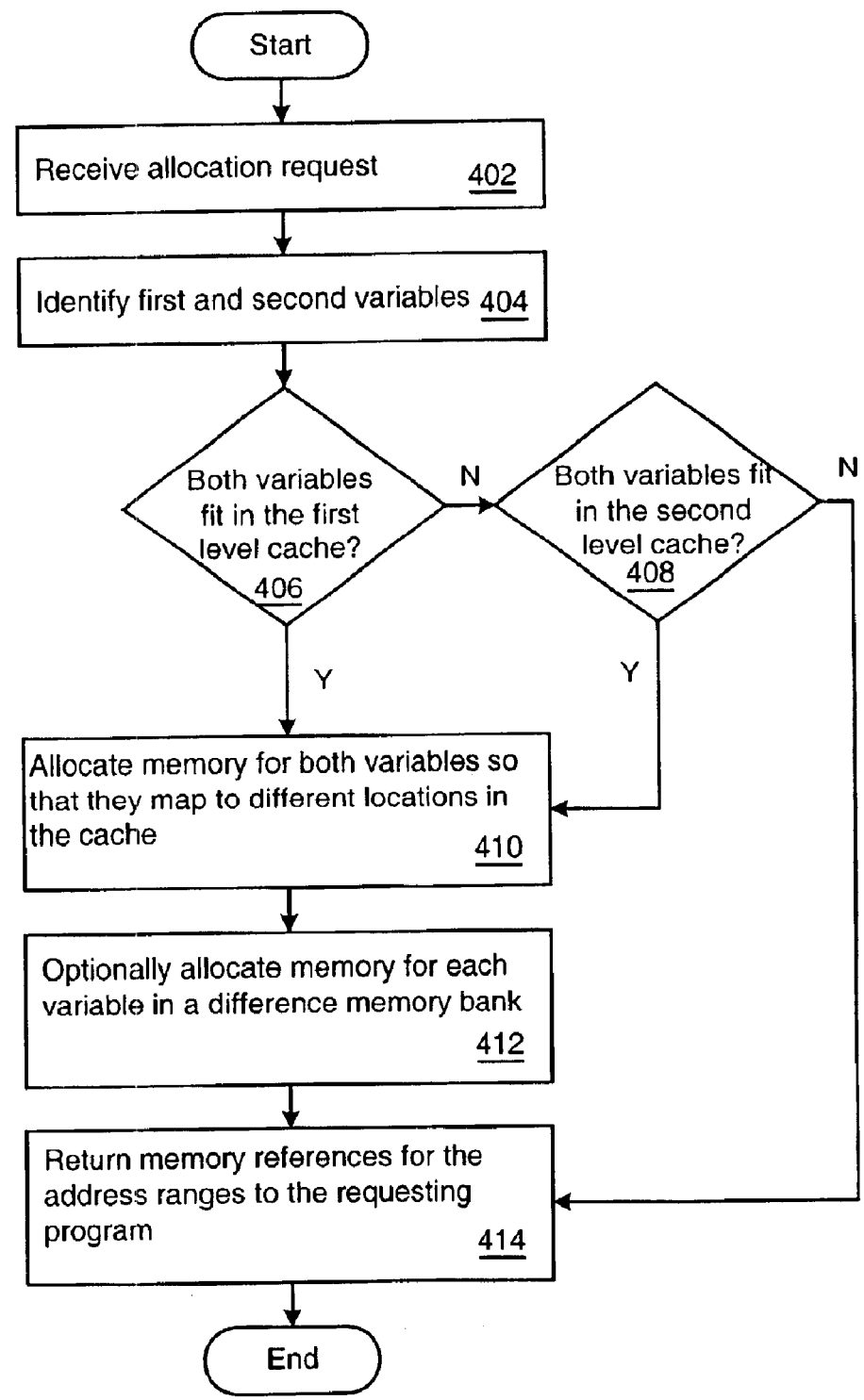
FIG. 4 depicts a flow diagram showing processing performed by the memory allocation program running in the data processing system shown in FIG. 1 in order to allocate memory for program variables.

FIG. 4 depicts a flow diagram illustrating the exemplary steps performed by memory allocation program 124 for allocating memory. First, memory allocation program 124 receives a memory allocation request from program 116 (Step 402). The memory allocation request may be, for example, a function call or message sent to memory allocation program 124 that asks for memory for one or more variables. For example, the memory allocation request may be a function call that asks for memory for array INPUT and array WORK. To that end, the memory allocation request may specify one or more memory block sizes needed for the variables. Thus, memory allocation program 124 determines sizes for the variables using the information provided with the allocation request (Step 404).

Next, memory allocation program 124 determines whether the variables specified will fit into first level cache 204 (Step 406). To do so, memory allocation program 124 determines the size of first level cache 204 and its configuration (e.g., number of cache lines and number of bytes per cache line) by, for example, querying operating system 118 or reading a configuration file. Memory allocation program 124, knowing the size of the variables then determines if both variables can coexist in one or more cache lines in first level cache 204. In the illustrative example, if the array INPUT is 64 bytes long and the array WORK is 128 bytes long, then for the illustrative cache having 32 byte cache lines, the array INPUT may reside in cache lines 0 and 1, while the array WORK may reside in cache lines 2, 3, 4, and 5.

If memory allocation program 124 determines that the variables are too large to simultaneously fit into the first level cache 204 in step 406, then memory allocation program 124 determines whether the variables will simultaneously fit into second level cache 208 (Step 408). Again, to make that determination, memory allocation program 124 may determine the size of second level cache 208 and its configuration.

If the variables will fit into either first level cache 204 or second level cache 208, then memory allocation program 124 allocates memory for the variables such that they will map to different locations in the fastest cache (Step 410). The fastest cache is typically the smallest cache closest to CPU core 202. Continuing the illustrative example given above, memory allocation program 124 may allocate address ranges as shown below in Table 2 so that the array INPUT will be placed in cache lines 0 and 1, while the array WORK will be placed in cache lines 2–5.

TABLE 2

| Variable | Start of address range | End of address range | Cache lines |
|---|---|---|---|
| INPUT 64 bytes | 1100 0111 0101 1111 0100 0000 0000 0000 0xC75F4000 | 1100 0111 0101 1111 0100 0000 0011 1111 0xC75F403F | 0 and 1 |
| WORK 128 bytes | 1100 0111 0101 1111 0100 0000 0100 0000 0xC75F4000 | 1100 0111 0101 1111 0100 0000 1011 1111 0xC75F403F | 2–5 |

In addition, memory allocation program 124 may further take into consideration the number and organization of memory banks 222 and 223 in main memory 218 (step 412). As noted above, sequential reads to the same memory bank can be slower than sequential reads to different memory banks. Thus, in addition to selecting address ranges that map the variables into different locations in the cache, memory allocation program 124 may also adjust the memory ranges for variables that are accessed sequentially so that they start in different memory banks. Thus, if program 116 sequentially accesses the variables, memory bank conflict will not hinder the retrieval of the data from main memory.

Subsequently, memory allocation program 124 returns memory references for the allocated memory regions to requesting program 116 (Step 414). For example, memory allocation program 124 may return pointers to the beginning of the allocated memory regions. Program 116 may then store its data (e.g., array INPUT and array WORK) in the allocated memory regions and benefit from having multiple variables reside in the cache simultaneously.

In another illustrative example, operating system 118 includes an extended version of the Unix 'C' library function madvise( ) in order to help guide program data closer to the processor that will access the program data. Accordingly, during FFT computation, variables such as signal samples and workspace data can be stored closer to the processor. Referring to the illustrative example introduced above, madvise( ) is used to store arrays INPUT and WORK close to the CPU. The madvise( ) function accepts, as parameters, a starting address, a length, and an advisory flag (e.g., madvise(caddr_t addr, size_t len, int advice)). The advisory flag guides the operating system 118 in locating or relocating the memory referred to in the call to madvise( ). In particular, Table 3 shows and explains the new advisory flags in the extended madvise( ) function.

TABLE 3

| Extension | Explanation |
|---|---|
| MADV_ACCESS_DEFAULT | Resets the kernel's expectation for how the specified address range will be accessed. |
| MADV_ACCESS_LWP | Tells the kernel that the next LWP (i.e., light weight process, or thread) to touch the specified address range will access it most heavily. The kernel should try to allocate the memory and other resources for the address range and the LWP accordingly (e.g., closer to the processor and memory that runs the LWP). |
| MADV_ACCESS_MANY | Tells the kernel that many processes or LWPs will access the specified address range randomly across the machine. The kernel should try to allocate the memory and other resources for the address range accordingly (e.g., by making copies of the data and distributing a copy to each processor that runs an LWP that accesses the address range). |

The madvise( ) function allows program 116 to specify that certain address ranges should be located as closely as possible to the processor that access the address ranges. Thus, in response to the MADV_ACCESS_LWP flag, for example, operating system 118 may determine which thread has accessed the address range, then relocate the data in the address range so that the data is close to the processor that accesses the data (i.e., the processor that runs the thread). To that end, operating system 118 may take into consideration the aspects of the memory hierarchy explained above, and for example, attempt to place the data so that it will fit into one or more levels of cache, or so that it will start in independent memory banks.

Similarly, operating system 118 may address the same considerations in response to the MADV_ACCESS_MANY flag. However, operating system 118 addresses those considerations for each of a predetermined number of threads that access the specified memory range after the call to madvise( ). More particularly, operating system 118 may make multiple copies of the data in the memory range, and distribute those copies close to the processors that run the individual threads. For example, operating system 118 may migrate pages in which the memory range lies to one or more memory boards.

The MADV_ACCESS_DEFAULT flag instructs operating system 118 to disregard any prior flags applied to the specified memory range. In other words, no operating system 118 will no longer perform the special processing noted above for the specified memory range. Program 116 may specify the MADV_ACCESS_DEFAULT flag before freeing a memory block, for example.

In yet another illustrative example, operating system 118 provides a memory advisory library that is useful when program 116 source code cannot be modified to include madvise( ) functions. More specifically, the madv library (stored, for example, in an object named madv.so.1) may operate as explained below in Table 4.

TABLE 4

The madv.so.1 shared object provides a means by which virtual memory advice can be selectively configured for launched process(es) and its descendants. To enable, the following string is presented in the environment:
    LD_PRELOAD=$LD_PRELOAD:madv.so.1
ENVIRONMENT VARIABLES
    If the madv.so.1 shared object is specified in the LD_PRELOAD
    list, the following environment variables are read by the madv
    shared object to determine which created process(es) to apply
    the specified advice.
    MADV=<advice>
        MADV specifies the virtual memory advice to use for all heap,
        shared memory, and mmap( ) regions in the process address
        space. This advice is applied to all created processes.
        Values for <advice> correspond to values in <sys/mman.h>
        used in madvise( ) to specify memory access patterns:
        normal
        random
        sequential
        access_lwp
        access_many
        access_default
    MADVCFGFILE=<config-file>
        <config-file> is, for example, a text file which contains one or
        more madv configuration entries of the form:
            <exec-name> <exec-args>:<advice-opts>
        Advice specified in <config-file> takes precedence over
        that specified by the MADV environment variable. When
        MADVCFGFILE is not set, advice is taken from file
        /etc/madv.conf file if it exists.
        <exec-name> specifies the name of a program.
        The corresponding advice is set for newly created processes
        (see the manual pages on getexecname( )) that match the first
        <exec-name> found in the file.
        <exec-name> can be a full pathname, a base name or a pattern
        string. See the manual pages on sh( ), and the section
        File Name Generation, for a discussion of pattern matching.
        <exec-args> is an optionally specified pattern string to
        match against arguments. Advice is set if <exec-args>
        is not specified or occurs within the arguments to <exec-name>.
        <advice-opts> is a comma-separated list specifying the
        advice for various memory region(s):
        madv=<advice>
            Applies to all heap, shared memory, and mmap( ) regions
            in the process address space.
        heap=<advice>
            The heap is defined to be the brk area (see the manual
            pages on brk( )). Applies to the existing heap and for any
            additional heap memory allocated in the future.
        shm=<advice>
        ism=<advice>
        dism=<advice>
            Shared memory segments (see the manual pages on
            shmat( )) attached using any flags, flag SHM_SHARE_
            MMU, or flag SHM_PAGEABLE respectively. Options
            ism and dism take precedence over option shm.
        map=<advice>
        mapshared=<advice>
        mapprivate=<advice>
        mapanon=<advice>
            Mappings established through mmap(2) using any
            flags, flag MAP_SHARED, flag MAP_PRIVATE, or flag
            MAP_ANON respectively. Options mapshared, mapprivate
            and mapanon take precedence over option map. Option
            mapanon takes precedence over mapshared and mapprivate.
    MADVERRFILE=<pathname>
        By default, error messages are logged via syslog( ) using
        Level LOG_ERR and facility LOG_USER. If TABLE 4-continued MADVERRFILE contains a valid <pathname> (such as /dev/
        stderr), error messages will be logged there instead.
NOTES
    The advice is inherited; a child process has the same advice
    as its parent. On exec( ) (see the manual pages on exec( )),
    the advice is set back to the default system advice unless
    different advice has been configured via the madv shared object.
    Advice is applied to mmap( ) regions explicitly created by the
    user program. Those regions established by the run-time linker
    or by system libraries making direct system calls (e.g. libthread
    allocations for thread stacks) are not affected.

Table 5 shows several examples of how to use the MADV library environment variables.

TABLE 5

Example 1.
    $ LD_PRELOAD=$LD_PRELOAD:madv.so.1
    $ MADVCFGFILE=madvcfg
    $ export LD_PRELOAD MADVCFGFILE
    $ cat $MADVCFGFILE
        /usr/bin/foo:ism=access_lwp
    The above configuration applies advice to all ISM segments
    for application /usr/bin/foo.
Example 2.
    $ LD_PRELOAD=$LD_PRELOAD:madv.so.1
    $ MADV=access_many
    $ MADVCFGFILE=madvcfg
    $ export LD_PRELOAD MADV MADVCFGFILE
    $ cat $MADVCFGFILE
        ls:
    Advice will be set for all applications with the
    exception of 'ls'.
Example 3.
    Because MADVCFGFILE takes precedence over MADV,
    specifying '*' (pattern match all) for the <exec-name>
    of the last madv configuration entry would cause the same result
    as setting MADV. The following causes the same result as example
    2:
    $ LD_PRELOAD=$LD_PRELOAD:madv.so.1
    $ MADVCFGFILE=madvcfg
    $ export LD_PRELOAD MADVCFGFILE
    $ cat $MADVCFGFILE
        ls:
        *:madv=access_many
Example 4.
    $ LD_PRELOAD=$LD_PRELOAD:madv.so.1
    $ MADVCFGFILE=madvcfg
    $ export LD_PRELOAD MADVCFGFILE
    $ cat $MADVCFGFILE
        foo*:madv=access_many,heap=sequential,shm=access_lwp
    The above configuration applies one type of advice for
    mmap( ) regions and different advice for heap and shared
    memory regions for a select set of applications with
    exec names that begin with 'foo'.
Example 5.
    $ LD_PRELOAD=$LD_PRELOAD:madv.so.1
    $ MADVCFGFILE=madvcfg
    $ export LD_PRELOAD MADVCFGFILE
    $ cat $MADVCFGFILE
        ora* ora1:heap=access_many
    The above configuration applies advice for the heap
    of applications beginning with ora that have ora1 as
    as an argument.

Generally, when operating system 118 recognizes that the MADV environment variables have been set, operating system 118 responsively creates startup code that executes before program 116 enters its main function. For example, when operating system 118 is the Solaris™ operating system, operating system 118 may create a function and store it in a section of the executable program or associated library known as a '.init' section. The .init section contains code that executes before the user-written portions of the program 116 start. Solaris is manufactured by Sun Microsystems, Inc. of Santa Clara, Calif. Sun, Sun Microsystems, and Solaris are trademarks or registered trademarks of Sun Microsystems, Inc. in the United States and other countries.

Operating system 118 reads the MADV environment variables and responsively creates calls to madvise( ) that reflect the environment variable settings. For example, each madvise( ) function call may specify a starting memory address for a particular memory region called out by the environment variables, the length of that region, and an advisory flag (e.g., MADV_ACCESS_LWP) that causes operating system 118 to respond to memory accesses in the way specified by the environment variable flags. Operating system 118 places the constructed madvise( ) calls in the .init function and they are therefore executed prior to the first or main routine in program 116.

The discussion above sets forth one particular example of operating system 118 interacting with memory advisory environment variables and a memory advisement library during FFT computation. The particular implementation of the environment variables and the library may vary considerably between data processing systems. In other words, methods and systems consistent with the present invention work in conjunction with many different implementations of memory advisory functionality.

In many cases, multiple program variables will not fit into cache at the same time in their entirety. As a result, methods and systems consistent with the present invention allocate memory for the variables so that the portion of the data needed by program 116 at any particular time will reside in the cache with portions of the other variables that program 116 needs at the same time. In other words, knowing the variable access pattern of an FFT algorithm, methods and systems consistent with the present invention will allocate space for the arrays during FFT computation such that the parts of the arrays can be used at any particular time.

In summary, memory allocation program 124 allocates memory for program data during FFT computation in a manner that improves data access efficiency compared to typical memory allocation methods used during FFT computation. The memory allocation of the methods and systems consistent with the present invention is dynamic and memory addresses are automatically assigned, taking into consideration, for example the memory architecture of a given data processing system. Because the overhead associated with accessing the program data is reduced, program 116 typically runs faster and produces results more quickly. Further, the power-of-two offset problems associated with typical memory allocation methods is eliminated.

It is noted that although the above-described example considered two variables, memory allocation program 124 may, in general, consider more than two variables. That is, memory allocation program 124 may determine which combination of variables will fit into the cache memory, and allocate an address range for each variable that causes the variable to map to a different location in the cache than the remaining variables.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

Appendix

```
C
C
C
C THE FAST FOURIER TRANSFORM
C NEW A SUB I=SUM FROM J=1 TO N
C EXP(2*PI*SQRT(-1)/N)**((I-1)*(J-1)) OLD A SUB J
C
C INPUT:
C
C A --COEFFICIENTS
C
C N --NUMBER OF COEFFICIENTS
C
C OUTPUT:
C
C A --TRANSFORMED COEFFICIENTS
C
C BUILTIN FUNCTIONS: ACOS,CEXP,CMPLX
C
C
      SUBROUTINE FFT(A,N,W)
      COMPLEX A(1),W(1),S,T,U,V
      INTEGER D,E,F,G,H,I,J,K,L,M,N,NP,O,P(25)
      DATA P/2,3,5,7,11,13,17,19,23,29,31,37,41,43,47,53,59,
     61,67,71,1
      73,79,83,89,97/
      DATA NP/25/
      M=N
      F=0
      U=CMPLX(0.,2.*ACOS(-1.)/N)
C - - -
C |***SOME COMPILERS USE ARCOS INSTEAD OF ACOS ***|
C - - -
10    IF (M .EQ. 1) GOTO 900
      DO 20 I=1,NP
20    IF ((M/P(I))*P(I). .EQ. M) GOTO 30
      L=M
      GOTO 40
30    L=P(I)
40    O=M
      M=M/L
      V=CEXP(M*U)
      S=(1.,0.)
      H=0
      IF (F .EQ. 1) GOTO 470
      IF (L .EQ. 2) GOTO 50
      IF (L .EQ. 3) GOTO 170
      GOTO 290
50    GOTO (150,130,110,90),M
60    J=-H
70    I=H+1
      H=H+M
      E=J+M
      DO 80 K=I,H
80    W(K)=A(J+K)+S*A(E+K)
      J=E
```

```
    s=S*V
    IF (J+H .LT. N) GOTO 70
    IF (H .LT. N) GOTO 60
    F=1
    GOTO 10
 90 J=-H
100 H=H+1
    E=J+M
    W(H)=A(J+H)+S*A(E+H)
    H=H+1
    W(H)=A(J+H)+S*A(E+H)
    H=H+1
    W(H)=A(J+H)+S*A(E+H)
    H=H+1
    W(H)=A(J+H)+S*A(E+H)
    J=E
    S=S*V
    IF (J+H .LT. N) GOTO 100
    IF (H .LT. N) GOTO 90
    F=1
    GOTO 10
110 J=-H
120 H=H+1
    E=J+M
    W(H)=A(J+H)+S*A(E+H)
    H=H+1
    W(H)=A(J+H)+S*A(E+H)
    H=H+1
    W(H)=A(J+H)+S*A(E+H)
    J=E
    S=S*V
    IF (J+H .LT. N) GOTO 120
    IF (H .LT. N) GOTO 110
    F=1
    GOTO 10
130 J=-H
140 H=H+1
    E=J+M
    W(H)=A(J+H)+S*A(E+H)
    H=H+1
    W(H)=A(J+H)+S*A(E+H)
    J=E
    S=S*V
    IF (J+H .LT. N) GOTO 140
    IF (H .LT. N) GOTO 130
    F=1
    GOTO 10
150 J=-H
160 H=H+1
    E=J+M
    W(H)=A(J+H)+S*A(E+H)
    J=E
    S=S*V
    IF (J+H .LT. N) GOTO 160
    IF (H .LT. N) GOTO 150
    F=1
    GOTO 10
170 GOTO (270,250,230,210),M
180 J=-H
190 I=H+1
    H=H+M
    E=J+M
    D=E+M
    T=S*S
    DO 200 K=I,H
200 W(K)=A(J+K)+S*A(E+K)+T*A(D+K)
    J=D
    S=S*V
    IF (J+H .LT. N) GOTO 190
    IF (H .LT. N) GOTO 180
    F=1
    GOTO 10
210 J=-H
220 H=H+1
    E=J+M
    D=E+M
    T=S*S
    W(H)=A(J+H)+S*A(E+H)+T*A(D+H)
    H=H+1
    W(H)=A(J+H)+S*A(E+H)+T*A(D+H)
    H=H+1
    W(H)=A(J+H)+S*A(E+H)+T*A(D+H)
    H=H+1
    W(H)=A(J+H)+S*A(E+H)+T*A(D+H)
    J=D
    S=S*V
    IF (J+H .LT. N) GOTO 220
    IF (H .LT. N) GOTO 210
    F=1
    GOTO 10
230 J=-H
240 H=H+1
    E=J+M
    D=E+M
    T=S*S
    W(H)=A(J+H)+S*A(E+H)+T*A(D+H)
    H=H+1
    W(H)=A(J+H)+S*A(E+H)+T*A(D+H)
    H=H+1
    W(H)=A(J+H)+S*A(E+H)+T*A(D+H)
    J=D
    S=S*V
    IF (J+H .LT. N) GOTO 240
    IF (H .LT. N) GOTO 230
    F=1
    GOTO 10
250 J=-H
260 H=H+1
    E=J+M
    D=E+M
    T=S*S
    W(H)=A(J+H)+S*A(E+H)+T*A(D+H)
    H=H+1
    W(H)=A(J+H)+S*A(E+H)+T*A(D+H)
    J=D
    S=S*V
```

```
    IF (J+H .LT. N) GOTO 260
    IF (H .LT. N) GOTO 250
    F=1
    GOTO 10
270 J=-H
280 H=H+1
    E=J+M
    D=E+M
    T=S*S
    W(H)=A(J+H)+S*A(E+H)+T*A(D+H)
    J=D
    S S*V
    IF (J+H .LT. N) GOTO 280
    IF (H .LT. N) GOTO 270
    F=1
    GOTO 10
290 GOTO (440,410,380,350),M
300 J=-H
310 T=(1.,0.)
    I=H+1
    H=H+M
    G=J+O
    DO 320 K=I,H
320 W(K)=(0.,0.)
330 DO 340 K=I,H
340 W(K)=W(K)+T*A(J+K)
    T=T*S
    J=J+M
    IF (J .LT. G) GOTO 330
    J=J-M
    S=S*V
    IF (J+H .LT. N) GOTO 310
    IF (H .LT. N) GOTO 300
    F=1
    GOTO 10
350 J=-H
360 T=(1.,0.)
    I=H+1
    E=I+1
    D=E+1
    H=H+M
    G=J+O
    W(I)=(0.,0.)
    W(E)=(0.,0.)
    W(D)=(0.,0.)
    W(H)=(0.,0.)
370 W(I)=W(I)+T*A(J+I)
    W(E)=W(E)+T*A(J+E)
    W(D)=W(D)+T*A(J+D)
    W(H)=W(H)+T*A(J+H)
    T=T*S
    J=J+M
    IF (J .LT. G) GOTO 370
    J=J-M
    S=S*V
    IF (J+H .LT. N) GOTO 360
    IF (H .LT. N) GOTO 350
    F=1
    GOTO 10
380 J=-H
390 T=(1.,0.)
    I=H+1
    E=I+1
    H=H+M
    G=J+O
    W(I)=(0.,0.)
    W(E)=(0.,0.)
    W(H)=(0.,0.)
400 W(I)=W(I)+T*A(J+I)
    W(E)=W(E)+T*A(J+E)
    W(H)=W(H)+T*A(J+H)
    T=T*S
    J=J+M
    IF (J .LT. G) GOTO 400
    J=J-M
    S=S*V
    IF (J+H .LT. N) GOTO 390
    IF (H .LT. N) GOTO 380
    F=1
    GOTO 10
410 J=-H
420 T=(1.,0.)
    I=H+1
    H=H+M
    G=J+O
    W(I)=(0.,0.)
    W(H)=(0.,0.)
430 W(I)=W(I)+T*A(J+I)
    W(H)=W(H)+T*A(J+H)
    T=T*S
    J=J+M
    IF (J .LT. G) GOTO 430
    J=J-M
    S=S*V
    IF (J+H .LT. N) GOTO 420
    IF (H .LT. N) GOTO 410
    F=1
    GOTO 10
440 J=-H
450 T=(1.,0.)
    I=H+1
    H=H+M
    G=J+O
    W(I)=(0.,0.)
460 W(I)=W(I)+T*A(J+I)
    T=T*S
    J=J+M
    IF (J .LT. G) GOTO 460
    J=J-M
    S=S*V
    IF (J+H .LT. N) GOTO 450
    IF (H .LT. N) GOTO 440
    F=1
    GOTO 10
470 IF (L .EQ. 2) GOTO 480
    IF (L .EQ. 3) GOTO 600
```

```
    GOTO 720
480 GOTO (580,560,540,520),M
490 J=-H
500 I=H+1
    H=H+M
    E=J+M
    DO 510 K=I,H
510 A(K)=W(J+K)+S*W(E+K)
    J=E
    S=S*V
    IF (J+H .LT. N) GOTO 500
    IF (H .LT. N) GOTO 490
    F=0
    GOTO 10
520 J=-H
530 H=H+1
    E=J+M
    A(H)=W(J+H)+S*W(E+H)
    H=H+1
    A(H)=W(J+H)+S*W(E+H)
    H=H+1
    A(H)=W(J+H)+S*W(E+H)
    J=E
    S=S*V
    IF (J+H .LT. N) GOTO 530
    IF (H .LT. N) GOTO 520
    F=0
    GOTO 10
540 J=-H
550 H=H+1
    E=J+M
    A(H)=W(J+H)+S*W(E+H)
    H=H+1
    A(H)=W(J+H)+S*W(E+H)
    H=H+1
    A(H)=W(J+H)+S*W(E+H)
    J=E
    S=S*V
    IF (J+H .LT. N) GOTO 550
    IF (H .LT. N) GOTO 540
    F=0
    GOTO 10
560 J=-H
570 H=H+1
    E=J+M
    A(H)=W(J+H)+S*W(E+H)
    H=H+1
    A(H)=W(J+H)+S*W(E+H)
    J=E
    S=S*V
    IF (J+H .LT. N) GOTO 570
    IF (H .LT. N) GOTO 560
    F=0
    GOTO 10
580 J=-H
590 H=H+1
    E=J+M
    A(H)=W(J+H)+S*W(E+H)
    J=E
    S=S*V
    IF (J+H .LT. N) GOTO 590
    IF (H .LT. N) GOTO 580
    F=0
    GOTO 10
600 GOTO (700,680,660,640),M
610 J=-H
620 I=H+1
    H=H+M
    E=J+M
    D=E+M
    T=S*S
    DO 630 K=I,H
630 A(K)=W(J+K)+S*W(E+K)+T*W(D+K)
    J=D
    S=S*V
    IF (J+H .LT. N) GOTO 620
    IF (H .LT. N) GOTO 610
    F=0
    GOTO 10
640 J=-H
650 H=H+1
    E=J+M
    D=E+M
    T=S*S
    A(H)=W(J+H)+S*W(E+H)+T*W(D+H)
    H=H+1
    A(H)=W(J+H)+S*W(E+H)+T*W(D+H)
    H=H+1
    A(H)=W(J+H)+S*W(E+H)+T*W(D+H)
    J=D
    S=S*V
    IF (J+H .LT. N) GOTO 650
    IF (H .LT. N) GOTO 640
    F=0
    GOTO 10
660 J=-H
670 H=H+1
    E=J+M
    D=E+M
    T=S*S
    A(H)=W(J+H)+S*W(E+H)+T*W(D+H)
    H=H+1
    A(H)=W(J+H)+S*W(E+H)+T*W(D+H)
    H=H+1
    A(H)=W(J+H)+S*W(E+H)+T*W(D+H)
    J=D
    S=S*V
    IF (J+H .LT. N) GOTO 670
    IF (H .LT. N) GOTO 660
    F=0
    GOTO 10
680 J=-H
```

```
690 H=H+1
   E=J+M
   D=E+M
   T=S*S
   A(H)=W(J+H)+S*W(E+H)+T*W(D+H)
   H=H+1
   A(H)=W(J+H)+S*W(E+H)+T*W(D+H)
   J=D
   S=S*V
   IF (J+H .LT. N) GOTO 690
   IF (H .LT. N) GOTO 680
   F=0
   GOTO 10
700 J=-H
710 H=H+1
   E=J+M
   D=E+M
   T=S*S
   A(H)=W(J+H)+S*W(E+H)+T*W(D+H)
   J=D
   S=S*V
   IF (J+H .LT. N) GOTO 710
   IF (H .LT. N) GOTO 700
   F=0
   GOTO 10
720 GOTO (870,840,810,780),M
730 J=-H
740 T=(1.,0.)
   I=H+1
   H=H+M
   G=J+O
   D0 750 K=I,H
750 A(K)=(0.,0.)
760 D0 770 K=I,H
770 A(K)=A(K)+T*W(J+K)
   T=T*S
   J=J+M
   IF (J .LT. G) GOTO 760
   J=J-M
   S=S*V
   IF (J+H .LT. N) GOTO 740
   IF (H .LT. N) GOTO 730
   F=0
   GOTO 10
780 J=-H
790 T=(1.,0.)
   I=H+1
   E=I+1
   D=E+1
   H=H+M
   G=J+Q
   A(I)=(0.,0.)
   A(E)=(0.,0.)
   A(D)=(0.,0.)
   A(H)=(0.,0.)
800 A(I)=A(I)+T*W(J+I)
   A(E)=A(E)+T*W(J+E)
   A(D)=A(D)+T*W(J+D)
   A(H)=A(H)+T*W(J+H)
   T=T*S
   J=J+M
   IF (J .LT. G) GOTO 800
   J=J-M
   S=S*V
   IF (J+H .LT. N) GOTO 790
   IF (H .LT. N) GOTO 780
   F=0 GOTO 10
810 J=-H
820 T=(1.,0.)
   I=H+1
   E=I±1
   H=H+M
   G=J+O
   A(I)=(0.,0.)
   A(E)=(0.,0.)
   A(H)=(0.,0.)
830 A(I)=A(I)+T*W(J+I)
   A(E)=A(E)+T*W(J+E)
   A(H)=A(H)+T*W(J+H)
   T=T*S
   J=J+M
   IF (J .LT. G) GOTO 830
   J=J-M
   S=S*V
   IF (J+H .LT. N) GOTO 820
   IF (H .LT. N) GOTO 810
   F=0
   GOTO 10
840 J=-H
850 T=(1.,0.)
   I=H+1
   H=H+M
   G=J+O
   A(I)=(0.,0.)
   A(H)=(0.,0.)
860 A(I)=A(I)+T*W(J+I)
   A(H)=A(H)+T*W(J+H)
   T=T*S
   J=J+M
   IF (J .LT. G) GOTO 860
   J=J-M
   S=S*V
   IF (J+H .LT. N) GOTO 850
   IF (H .LT. N) GOTO 840
   F=0
   GOTO 10
870 J=-H
880 T=(1.,0.)
   I=H+1
   H=H+M
   G=J+O
   A(I)=(0.,0.)
890 A(I)=A(I)+T*W(J+I)
   T=T*S
   J=J+M
   IF (J .LT. G) GOTO 890
```

```
J=J-M
S=S*V
IF (J+H .LT. N) GOTO 880
IF (H .LT. N) GOTO 870
F=0
GOTO 10
900 IF (F .EQ. 0) RETURN
    DO 910 I=1,N
910 A(I)=W(I)
    RETURN
    END
```

What is claimed is:

1. A method for allocating memory during fast Fourier transform computation in a data processing system including a first cache memory and a main memory, the method comprising the steps of:

receiving from a fast Fourier transform computing program a request to allocate memory for a first variable and a second variable;

determining when both variables will simultaneously fit in the first cache memory;

when both variables will fit in the first cache memory, allocating a first address range in the main memory for the first variable and a second address range in the main memory for the second variable, such that the first variable and the second variable map to different locations in the first cache memory; and returning to the fast Fourier transform computing program a first memory reference for the first address range and a second memory reference for the second address range.

2. The method of claim 1 wherein the main memory comprises a first bank of memory and a second bank of memory, and wherein the step of allocating further comprises the step of allocating the first address range to begin in the first bank of memory and allocating the second address range to begin in the second bank of memory.

3. The method of claim 1, wherein:

when both variables will not fit into the first cache memory, allocating the first address range and the second address range such that at least a portion of both the first and second variables will simultaneously reside in the first cache memory.

4. The method of claim 1, wherein the data processing system further includes a second cache memory, and determining when both variables will not fit in the first cache memory but both variables will fit in the second cache memory, and in response allocating the first address range in the main memory for the first variable and the second address range in the main memory for the second variable, such that the first variable and the second variable map to different locations in the second cache memory.

5. The method of claim 1, wherein the first cache memory is a direct mapped cache memory.

6. The method of claim 1, wherein the first cache memory is an associative cache memory.

7. The method of claim 1, wherein the first variable comprises a signal sample array and wherein the second variable comprises a table of trigonometric values for use in computing a fast Fourier transform.

8. The method of claim 7, wherein the second variable further comprises fast Fourier transform workspace.

9. A computer-readable medium containing instructions that cause a data processing system including a first cache memory and a main memory to perform a method for allocating memory during fast Fourier transform computation, the method comprising the steps of:

receiving from a fast Fourier transform computing program a request to allocate memory for a first variable and a second variable;

determining when both variables will simultaneously fit in the first cache memory;

when both variables will fit in the first cache memory, allocating a first address range in the main memory for the first variable and a second address range in the main memory for the second variable, such that the first variable and the second variable map to different locations in the first cache memory; and returning to the fast Fourier transform computing program a first memory reference for the first address range and a second memory reference for the second address range.

10. The computer-readable medium of claim 9 wherein the main memory comprises a first bank of memory and a second bank of memory, and wherein the step of allocating further comprises the step of allocating the first address range to begin in the first bank of memory and allocating the second address range to begin in the second bank of memory.

11. The computer-readable medium of claim 9, wherein:

when both variables will not fit into the first cache memory, allocating the first address range and the second address range such that at least a portion of both the first and second variables will simultaneously reside in the first cache memory.

12. The computer-readable medium of claim 9, wherein the data processing system further includes a second cache memory, and determining when both variables will not fit in the first cache memory but both variables will fit in the second cache memory, and in response allocating the first address range in the main memory for the first variable and the second address range in the main memory for the second variable, such that the first variable and the second variable map to different locations in the second cache memory.

13. The computer-readable medium of claim 9, wherein the first cache memory is a direct mapped cache memory.

14. The computer-readable medium of claim 9, wherein the first cache memory is an associative cache memory.

15. The computer-readable medium of claim 9, wherein the first variable comprises a signal sample array and wherein the second variable comprises a table of trigonometric values for use in computing a fast Fourier transform.

16. The computer-readable medium of claim 15, wherein the second variable further comprises fast Fourier transform workspace.

17. A data processing system comprising:

a first cache memory;

a main memory comprising a memory allocation program, the memory allocation program for receiving a request to allocate memory for a first variable and a second variable during fast Fourier transform computation, the first variable and the second variable being used by a fast Fourier transform computing program to compute a fast Fourier transform, determining when both variables will simultaneously fit in the first cache memory, and in response allocating a first address range in the main memory for the first variable and a second address range in the main memory for the second variable, such that the first variable and the second variable map to different locations in the first cache memory; and a processor that runs the memory allocation program.

18. The data processing system of claim 17, wherein the memory allocation program determines a first cache memory size and a first cache memory organization.

19. The data processing system of claim 17, wherein:
when both variables will not fit into the first cache memory, allocating the first address range and the second address range such that at least a portion of both the first and second variables will simultaneously reside in the first cache memory.

20. The data processing system of claim 17, wherein the main memory comprises a first memory bank and a second memory bank, and wherein:
the memory allocation program further allocates the first address range to begin in the first memory bank and allocating the second address range to begin in the second memory bank.

21. The data processing system of claim 17, wherein the first cache memory is a direct mapped cache memory.

22. The data processing system of claim 17, wherein the first cache memory is a set associative cache memory.

23. A data processing system comprising:
means for receiving from a fast Fourier transform computing program a request to allocate memory for a first variable and a second variable;
means for determining when both variables will simultaneously fit in the first cache memory and responsively allocating a first address range in the main memory for the first variable and a second address range in the main memory for the second variable, such that the first variable and the second variable map to different locations in the first cache memory; and
means for returning to the fast Fourier transform computing program a first memory reference for the first address range and a second memory reference for the second address range.

24. A method for allocating memory during fast Fourier transform computation in a data processing system including a first level cache, a second level cache, and a main memory comprising a first memory bank and a second memory bank, the method comprising the steps of:
receiving from a fast Fourier transform computing program a request to allocate memory for a first variable and a second variable;
identifying a first variable size for which to allocate memory;
identifying a second variable size for which to allocate memory;
determining when both variables will simultaneously fit in the first level cache by determining a first variable size, a second variable size, a first level cache size and a first level cache organization;

when both variables will simultaneously fit in the first level cache, allocating a first address range in the main memory for the first variable and allocating a second address range in the main memory for the second variable, such that the first variable and the second variable map to different locations in the first level cache;

when both variables will not simultaneously fit in the first level cache, determining when both variables will simultaneously fit in the second level cache by further determining, a second level cache size and a second level cache organization; and when both variables will simultaneously fit in the second level cache, allocating the first address range in the main memory for the first variable and allocating the second address range in the main memory for the second variable, such that the first variable and the second variable map to different locations in the second level cache; and when both variables will not simultaneously fit in either the first level cache or the second level cache, then allocating the first address range to begin in the first memory bank and allocating the second address range to begin in the second memory bank.

25. A method according to claim 24, wherein the step of determining the first level cache organization comprises determining a first level cache mapping and a first level cache line size.

26. A method according to claim 24, wherein the step of determining the second level cache organization comprises determining a second level cache mapping and a second level cache line size.

27. A method according to claim 24, wherein the first variable comprises a signal sample array and wherein the second variable comprises a fast Fourier transform workspace.

28. A method according to claim 24, further comprising the step of:
when both variables will not fit into the first cache memory and will not fit into the second cache memory, allocating the first address range and the second address range such that at least a portion of both the first and second variables will simultaneously reside in the first cache memory.

29. A method according to claim 24, further comprising the step of:
when both variables will not fit into the first cache memory and will not fit into the second cache memory, allocating the first address range and the second address range such that at least a portion of both the first and second variables will simultaneously reside in the second cache memory.

* * * * *